(No Model.)

C. H. MITCHELL.
SHIFTING DEVICE FOR VEHICLE BODIES.

No. 488,444. Patented Dec. 20, 1892.

WITNESSES:
Chas. Nida.
C. Sedgwick.

INVENTOR
C. H. Mitchell
BY
Munn & Co.
ATTORNEYS.

UNITED STATES PATENT OFFICE.

CHARLES H. MITCHELL, OF OXFORD, OHIO.

SHIFTING DEVICE FOR VEHICLE-BODIES.

SPECIFICATION forming part of Letters Patent No. 488,444, dated December 20, 1892.

Application filed April 4, 1892. Serial No. 427,682. (No model.)

*To all whom it may concern:*

Be it known that I, CHARLES H. MITCHELL, of Oxford, in the county of Butler and State of Ohio, have invented a new and Improved Shifting Device for Vehicle-Bodies, of which the following is a full, clear, and exact description.

My invention relates to a shifting device adapted for use in connection with vehicle bodies, and has for its object especially to provide a device whereby the front or rear portion of a vehicle body may be shifted laterally upon the axle in a convenient and expeditious manner; and another object of the invention is to provide a simple and durable device adapted to connect the body with the front axle of a thrashing machine, separator, straw stacker, clover huller, or any agricultural implement adapted to be driven by steam, through the medium of which device the agricultural implement may be adjusted with relation to the driving pulley of an engine in such a manner as to cause the driving belt to run straight, or whereby an engine may be adjusted laterally to bring its driving pulley in alignment with the driving pulley of the machine to be driven.

The invention consists in the novel construction and combination of the several parts, as will be hereinafter fully set forth and pointed out in the claims.

Reference is to be had to the accompanying drawings forming a part of this specification, in which similar figures of reference indicate corresponding parts in all the views.

Figure 1:
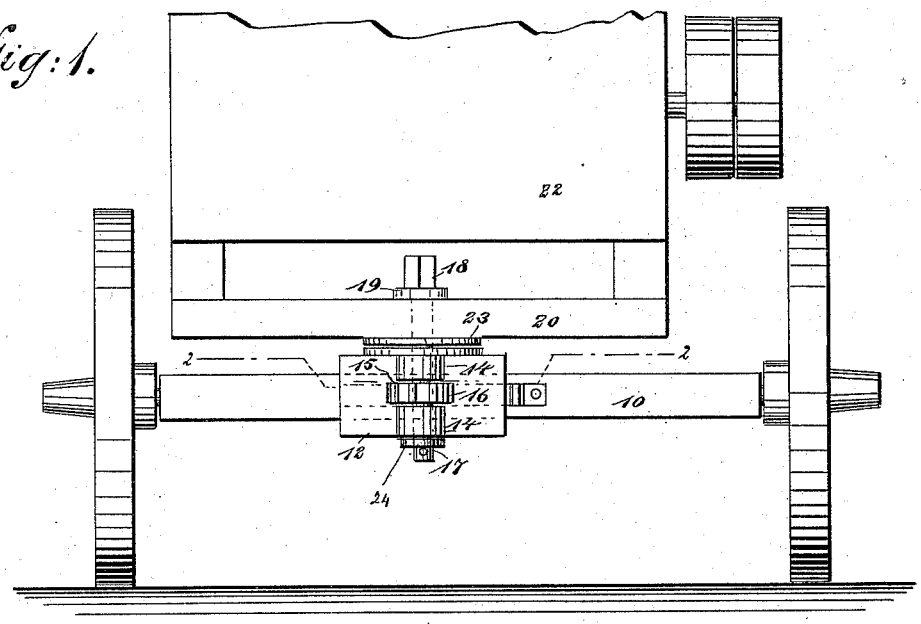
Figure 2:
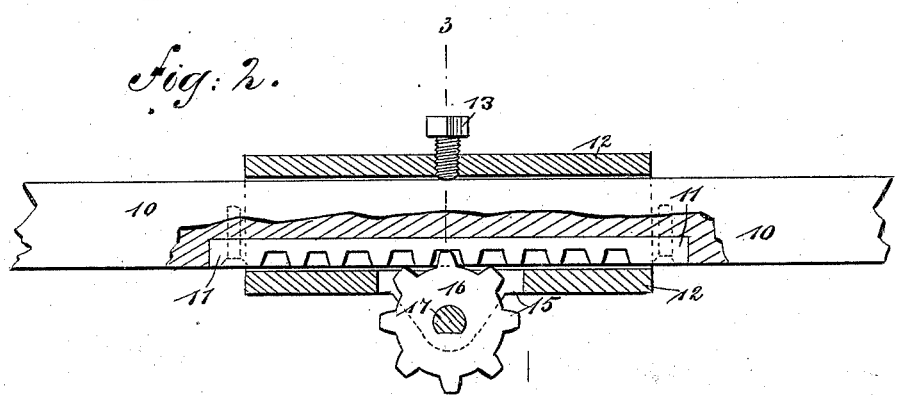
Figure 3:
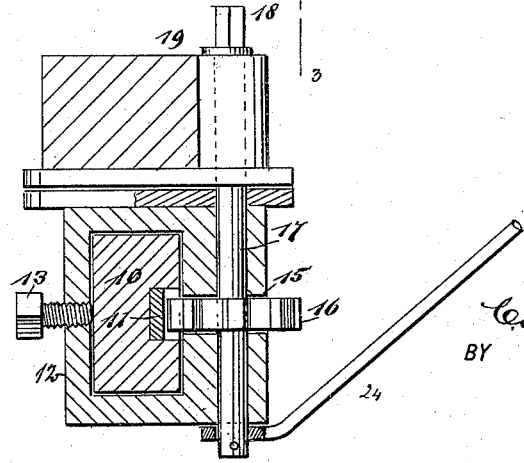

Figure 1 is a front elevation of the front axle and a portion of the lower part of the body of a thrashing machine, illustrating the device as connecting the body with the axle; Fig. 2 is a horizontal section taken practically on the line 2—2 of Fig. 1; and Fig. 3 is a vertical section taken essentially on the line 3—3 of Fig. 2.

In carrying out the invention, the axle 10, is provided preferably upon its outer face with a rack 11, secured thereto, the axle being longitudinally recessed to receive the rack, and the rack is so located that it is about centrally placed between the top and bottom faces of the axle, and the outer faces of the rack teeth are essentially flush with the outer front surface of the axle, as is best shown in Fig. 2.

A sleeve 12, is loosely mounted upon the axle, being capable of a sliding movement thereon, and when desirable the sleeve may be firmly fixed upon the axle by means of set screws 13, or the equivalents thereof. The sleeve is usually provided with an extension 14 upon its front face at its center. This extension extends from top to bottom, and through the extension, when it is employed, and through the body of the sleeve a horizontal opening 15, is produced, which opening is adapted to receive a pinion 16, the said pinion being so located as to engage with the rack upon the axle. The extension 14 of the sleeve is further provided with a vertical bore, which extends through it from top to bottom, and this bore is adapted for the reception of the king bolt 17 of the vehicle. This bolt is provided with an extension 18 on its head 19, the extension being polygonal in cross section so that it may be readily grasped by the jaws of a wrench. The king bolt is provided with the usual brace 24. The sleeve being upon the axle in proper position, the king bolt is passed through the sill 20 of the vehicle body 22 and thence down through the wear plates 23, if employed, or through the fifth wheel and from thence through the vertical bore in the extension of the sleeve and through the pinion 16, also, the king bolt being keyed or otherwise secured to the pinion so that it will turn with the bolt. Thus in operation, for instance, when a thrashing machine is brought in position to be driven by an engine, and it is found that the driving pulleys of the machine are not in alignment with the driving pulley of the engine they can be quickly brought into alignment by laterally adjusting the body of the thrasher, and this is conveniently and expeditiously effected by loosening the set screw 13, applying a wrench or like implement to the head of the king-bolt and turning said bolt in the direction to cause the sleeve to slide upon the axle either to the right or to the left as may be required, which motion is acquired by the king bolt turning the pinion 16 and the latter traveling in the rack upon the axle. When the proper adjustment has been made the set screw is manipulated to bind the sleeve to the axle.

It will be observed that by the simple device above described the hard wear which driving belts must endure by reason of the driving machine not being in proper alignment with the machine to be driven is obviated, and a straight belt connection may be at all times obtained, and there is not only a saving to the belt but also a saving of power when this device is employed.

Having thus described my invention, I claim as new and desire to secure by Letters Patent,—

1. A device for shifting the bodies of vehicles upon their axles, consisting of a rack adapted for attachment to the axle, a sleeve capable of sliding upon the axle over the rack, a bolt held to turn in the sleeve, and a pinion carried by the bolt and adapted for engagement with the rack, as and for the purpose specified.

2. A device for shifting the bodies of vehicles upon their axles, which consists in a rack adapted for attachment to the axle, a sleeve adapted to slide upon the axle over the rack, a king bolt held to turn in the sleeve, a pinion attached to the king bolt and adapted to engage with the rack, and a locking device carried by the sleeve, as and for the purpose set forth.

3. The combination, with the body of the vehicle, its axle and a rack formed upon a face of the axle, of a sleeve held to slide upon the axle over the rack, a bolt connecting the body of the vehicle with the sleeve and capable of turning in its seat, and a pinion secured to the bolt and engaging with the rack, as and for the purpose set forth.

4. The combination, with the body of a vehicle and an axle having a rack formed upon its face, of a sleeve held to slide upon the axle over the rack, a king bolt connecting the body of the vehicle and the sleeve, the said bolt being capable of turning in its seat, a pinion secured to the bolt and engaging with the rack, and a locking mechanism carried by the sleeve and adapted for engagement by the axle, as and for the purpose specified.

5. The combination, with a vehicle body and an axle located beneath the body, the said axle having a rack formed upon the inner face, of a sleeve capable of sliding movement on the axle over the rack, a king bolt passed through a portion of the body of the vehicle and through the sleeve and connecting the two, one end of the king bolt being polygonal in cross section, a pinion secured to the king bolt, in engagement with the rack, and a locking device adapted for rigidly attaching the sleeve to the axle, as and for the purpose specified.

CHARLES H. MITCHELL.

Witnesses:
P. J. FABER,
GEORGE E. MITCHELL.